Figure 1:
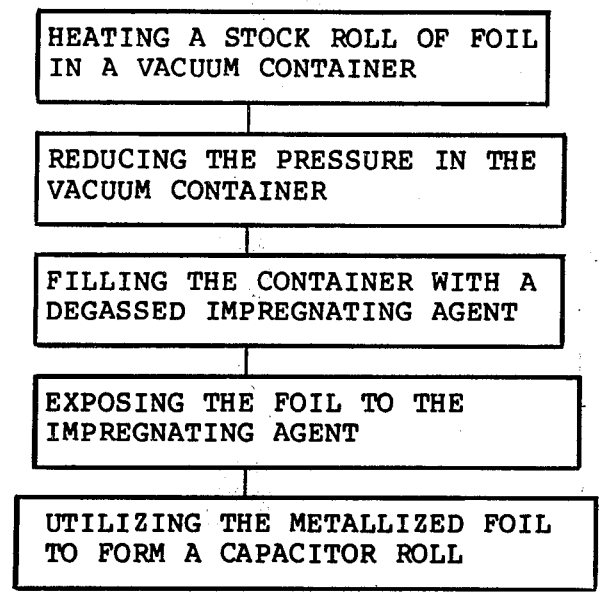

United States Patent [19]

Schmalz

[11] 4,210,98

[45] Jul. 8, 198

[54] METHOD OF MANUFACTURING A CAPACITOR ROLL, AND A CAPACITOR COMPRISING A ROLL THUS MANUFACTURED

[75] Inventor: Johann Schmalz, Bischoffen, Fed. Rep. of Germany

[73] Assignee: U.S. Philips Corporation, New York, N.Y.

[21] Appl. No.: 899,288

[22] Filed: Apr. 24, 1978

Related U.S. Application Data

[63] Continuation of Ser. No. 763,656, Jan. 28, 1977, abandoned.

[30] Foreign Application Priority Data

Feb. 13, 1976 [DE] Fed. Rep. of Germany ....... 2605663

[51] Int. Cl.$^2$ ............................................. H01G 4/18
[52] U.S. Cl. ................................... 29/25.42; 427/81; 427/177; 427/296
[58] Field of Search ............................... 361/314–318; 29/25.42; 427/81, 177, 179, 296

[56] References Cited

U.S. PATENT DOCUMENTS

| 3,090,705 | 5/1963 | Miksits | 361/318 |
| 3,737,961 | 6/1973 | Lapp et al. | 29/25. |

FOREIGN PATENT DOCUMENTS 1131744 10/1968 United Kingdom ..................... 361/3

Primary Examiner—Carl E. Hall
Attorney, Agent, or Firm—Thomas A. Briody; Jack Oisher; James J. Cannon, Jr.

[57] ABSTRACT

For the manufacture of capacitor rolls for wound c pacitors, the impregnation is performed by subjectir the dielectric foils on their stock rolls to an impregna ing treatment in vacuum. The capacitors manufactur from the capacitor rolls thus obtained have a compar tively high breakdown voltage. The manufacture of tl complete capacitor is no longer interrupted for an ir pregnation treatment.

4 Claims, 2 Drawing Figures

METHOD OF MANUFACTURING A CAPACITOR ROLL, AND A CAPACITOR COMPRISING A ROLL THUS MANUFACTURED

This is a continuation of application Ser. No. 763,656 filed Jan. 28, 1977, now abandoned.

The invention relates to a method of manufacturing a capacitor roll in which metallized dielectric foils of synthetic material or metal foils together with dielectric foils of synthetic material which are present on stock rolls are wound without a moisture-absorbing intermediate layer, in order to form a capacitor roll, the dielectric foils being provided with an impregnating agent.

The following methods of impregnating foil capacitors are known:

(a) the capacitor rolls are impregnated in a vacuum container after winding. This method is comparatively timeconsuming, while, moreover, the manufacturing process of the capacitors is interrupted;

(b) from German Patent Application No. 2 403 125 it is known to provide the impregnating agent on both sides of the dielectric foils during winding. This can be effected either by spraying or in a bath containing an impregnating agent and wherethrough the foil is transported. A method of impregnating of this kind involves the risk of air being trapped between the dielectric foil and the impregnating central layer, which may cause rejects due to ionization. Moreover, it is not simple to provide a comparatively thin layer of impregnating agent according to this method;

(c) from German Patent Application No. 2 108 988 it is known to impregnate a moisture-absorbing paper strip which is processed, together with the dielectric foils, to form a capacitor roll. The additional paper layer, however, causes increased dimensions of the capacitor roll.

The invention has for its object to perform the impregnation of the dielectric foils during the manufacture of capacitor rolls in a simple manner without an additional moisture absorbing intermediate layer and without the manufacturing process of the complete capacitors to be manufactured from the rolls thus obtained being adversely affected.

To this end, the invention is characterized in that the dielectric foils are impregnated in vacuum on their stock rolls.

The impregnation of the foils still present on stock rolls is effected prior to the start of the actual production of the capacitor roll. As a result of this vacuum impregnation treatment, a very thin layer of impregnating agent without air inclusions is obtained between the turns of the foil rolls. Consecutively, capacitor rolls are manufactured in the usual manner from the foil rolls thus impregnated.

Figure 2:
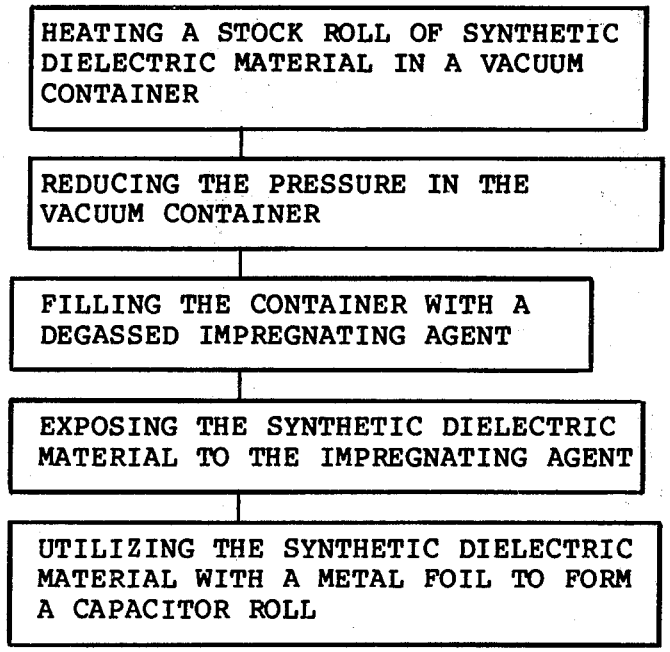

FIGS. 1 and 2 are flow charts of two embodiments of the disclosed process.

The invention will be described in detail hereinafter with reference to a preferred embodiment.

The polyester foil rolls required for the manufacture of polyester foil wound capacitors (two 8-$\mu$ polyester foils and two 5-$\mu$ aluminium foils) are subjected in the delivery condition, i.e. on the stock rolls, to a heat treatment in an empty vacuum container for 10 to 20 minutes at a temperature of between 50° C. and 60° C. Meanwhile, the silicon oil to be used as the impregnating agent is degassed in a stock container in a vacuum of 0.5 Torr. Consecutively, the foil rolls are evacuated for 30 minutes to 0.01 Torr in the vacuum container. Subsequently, the vacuum holder is filled with the previously degassed silicon oil. The stock rolls are removed from the impregnating bath after 20 to 30 minutes.

The dielectric foils thus manufactured have been used to form, in conjunction with metal foils, capacitor rolls in the usual manner, and have been compared with capacitor rolls without impregnated polyester foils. The breakdown strength of the capacitor rolls comprising the polyester foil impregnated in accordance with the invention amounted to 2430 V, while the breakdown strength of the capacitor rolls comprising the nonimpregnated polyester foils amounted to 1725 V. The breakdown strength of corresponding capacitor rolls having a non-impregnated 12-$\mu$ polyester foil amounted to 2400 V. This demonstrates that the 8-$\mu$ foils impregnated by the method in accordance with the invention have the same breakdown strength as non-impregnated 12-$\mu$ foils.

Also the number of weak spots (the number of electrical breakdowns through the foils when a test voltage 1800 V is applied) of the dielectric foil is substantially reduced by the impregnating treatment in accordance with the invention.

For example, silicon oil or wax can be used as the impregnating agent. The dielectric foils can be made of polypropylene, polyester, polycarbonate or polystyrene. The dielectric foils may be metallized. Use can alternatively be made of separate metal foils. Due to the thinner intermediate impregnating layer, the capacitors manufactured in accordance with the invention have higher capacitance relative to the capacitors impregnated in accordance with the known methods, and also show a substantial capacitance increase relative to non impregnated capacitors because, for example, silicon oil has a dielectric constant of 2.5.

What is claimed is:

1. A method of manufacturing a capacitor roll comprising the steps of:
   heating a stock roll of metallized dielectric foil of synthetic material, without a moisture-absorbing intermediate layer, in a vacuum container;
   reducing the pressure in said vacuum container;
   filling said vacuum container with a degassed impregnating agent;
   exposing said dielectric foil in said vacuum container to said impregnating agent; and
   subsequently utilizing said metallized dielectric foil form a capacitor roll.

2. A method as defined in claim 1, wherein said heating step takes place at a temperature of between 50° and 60° C., said pressure is reduced to approximately 0.0 Torr, and said dielectric foils are exposed to said impregnating agent for at least 15 minutes.

3. A method of manufacturing an impregnated dielectric foil for a capacitor roll comprising the steps of:
   heating a stock roll of synthetic dielectric material without a moisture absorbing intermediate layer, a vacuum container;
   reducing the pressure in said vacuum container;
   filling said vacuum container with a degassed impregnating agent;
   exposing said dielectric material in said vacuum container to said impregnating agent; and
   subsequently utilizing said dielectric material wound with a capacitive foil to form a capacitor roll.

4. A method as defined in claim 3, wherein said heating step takes place at a temperature of between 50° and 60° C., said pressure is reduced to approximately 0.0 Torr, and said dielectric foils are exposed to said impregnating agent for at least 15 minutes.

* * * * *